April 26, 1966  E. K. RANKE  3,247,716

PRESSURE RATIO INDICATOR

Filed March 9, 1962

INVENTOR.
EDWARD K. RANKE
BY Whittemore
Hulbert & Belknap
ATTORNEYS.

United States Patent Office 3,247,716
Patented Apr. 26, 1966

3,247,716
PRESSURE RATIO INDICATOR
Edward K. Ranke, Rochester, Mich., assignor to Holley Carburetor Company, Warren, Mich., a corporation of Michigan
Filed Mar. 9, 1962, Ser. No. 178,595
6 Claims. (Cl. 73—398)

The invention relates to pressure sensing devices and refers more specifically to apparatus for sensing and indicating the ratio between two pressures.

In the past pressure ratio indicators have generally been complicated so that their weight and expense precluded their use on small aircraft and similar devices. Wherein pressure ratio indicators have been sufficiently simple they have often been inaccurate and unreliable.

It is therefore one of the objects of the present invention to provide an improved pressure ratio indicator.

Another object is to provide mechanical means for sensing different pressures in combination with an electrical circuit responsive to said mechanical means for providing an indication of the ratio of the sensed pressures.

Another object is to provide a pressure ratio indicator comprising mechanical means for sensing a pair of different pressures, an electrical circuit for providing an indication of the ratio of the sensed pressures when coupled to the mechanical pressure sensing means and apparatus coupling the pressure sensing means to the electrical circuit.

Another object is to provide a pressure ratio indicator as set forth above wherein the pressure sensing means comprises Bourdon mechanisms supported in a vacuum.

Another object is to provide a pressure ratio indicator as set forth above wherein the electrical circuit comprises a source of regulated direct current electrical energy in series with a resistor, a potentiometer and rheostat connected in parallel with the battery and resistor and a current meter in series with the rheostat.

Another object is to provide structure as set forth above wherein the apparatus for coupling the pressure sensing means and the electrical circuit comprises rack and pinion means actuated by the Bourdon mechanisms which are mechanically connected to the movable arms of the potentiometer and rheostat for transferring movement of the Bourdon mechanisms into linearly proportional movement of the movable arms.

Another object is to provide a pressure ratio indicator which is simple in construction, economical to manufacture and efficient in use.

Other objects and features of the invention will become apparent as the description proceeds, especially when taken in conjunction with the accompanying drawings, illustrating a preferred embodiment of the invention, wherein.

With particular reference to the figures of the drawings one embodiment of the present invention will now be disclosed.

Figure 1:
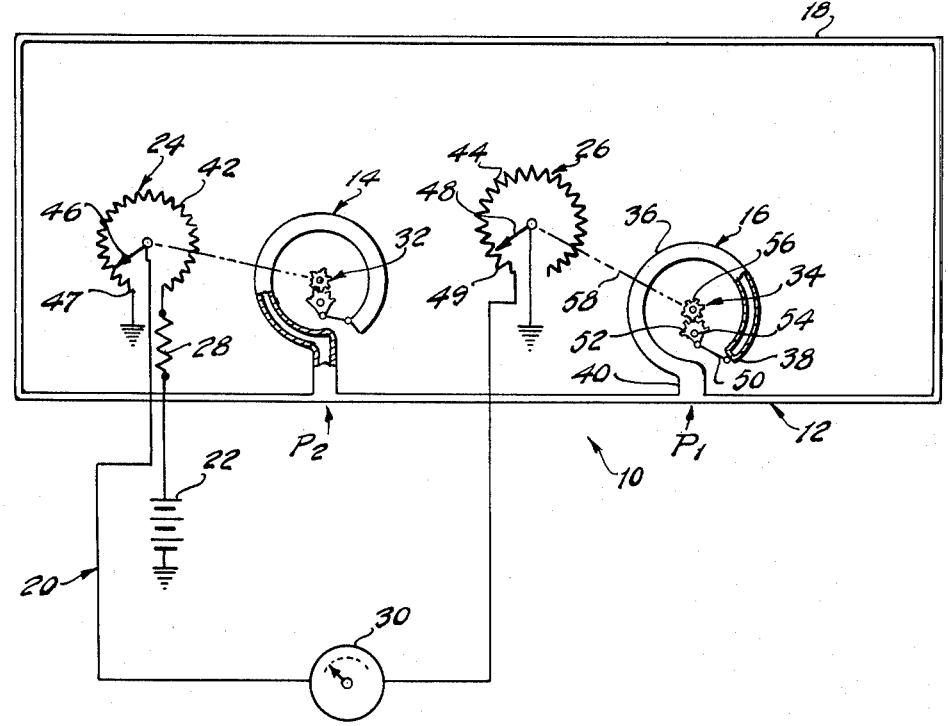
FIGURE 1 is a partly schematic, partly diagrammatic illustration of a pressure ratio indicator constructed in accordance with the invention.

The pressure ratio indicator 10 illustrated in FIGURE 1 comprises the mechanical pressure sensing means generally indicated 12 including the Bourdon mechanisms 14 and 16 positioned within the evacuated enclosure 18 operable to sense different external pressures $P_2$ and $P_1$. In addition the electrical circuit 20 including the source of electrical energy 22, potentiometer 24 and rheostat 26, resistor 28 and indicator 30 is provided in the pressure ratio indicator 10.

In operation the indicator 30 registers the ratio of $P_2/P_1$ with the electrical circuit 20 coupled to the pressure sensing means 12 by the coupling apparatus 32 and 34. The coupling apparatus 32 and 34 in the embodiment of the invention shown are rack and pinion means.

The Bourdon mechanisms 14 and 16 as illustrated in FIGURE 1 are exactly the same. Therefore only the Bourdon mechanism 16 will be described. The Bourdon mechanism 16 is constructed of a hollow tube 36 of brass or similar metal which tube has an elliptical cross section and is bent in the form of a circle in the usual manner. When a pressure differential is created between the inside and outside of the tube 36 the tube will tend to assume a circular cross section and the end 38 thereof will move outwardly from the end 40 which is fixed to the enclosure 18. Bourdon mechanisms are well known so the particular Bourdon mechanisms 14 and 16 will therefore not be considered in further detail.

The electrical circuit 20 as previously indicated includes the potentiometer 24 and rheostat 26 having resistances 42 and 44 and movable wiper arms 46 and 48 respectively. The rheostat 26 has a total resistance which is much larger than the total resistance of the potentiometer 24. The resistance ratio of the potentiometer 24 and rheostat 26 may be for example in the order of two hundred to one. The difference in total resistance of the potentiometer 24 and rheostat 26 permits an approximation as will later become evident.

The resistance 28 is a fixed precision resistor for the purpose of trimming potentiometer 24 and may be of the magnitude of the total resistance of the potentiometer 24. The source of electrical energy 22 may be for example a regulated direct current source available on an aircraft or other device on which the pressure ratio indicator is installed and may be for example of twenty-eight volts magnitude.

Meter 20 is an ammeter so that it will measure the current flowing through the portion 49 of the resistance 44 of the rheostat 26 between the ammeter 30 and the wiper arm 48. The scale face of the ammeter may of course be marked with color bands, numbers or other desirable indicia. Further the ammeter may be replaced by a current sensitive relay for automatic go-no go pressure ratio transducing as will be evident to those in the art.

The coupling apparatus 32 and 34 are exactly the same so that only the coupling apparatus 34 will be considered in detail. The coupling apparatus 34 includes the linking member 50 pivoted at one end to end 38 of the Bourdon mechanism 16 and at the other end to the rack 52. Linking member 50 is operable to produce rotation of the rack 52 about the pivotal mounting 54 thereof on movement of the end 38 of the Bourdon mechanism 16 in response to a differential pressure being applied between the inside and outside of the tube 36. Rack 52 therefore rotates the pinion 56 mounted in mesh therewith. The pinion 56 is mechanically connected to the wiper arm 48 of the rheostat 26 as indicated by the dotted line 58 to produce movement of the rheostat wiper arm on rotation of the pinion 56.

The resistors 42 and 44 of potentiometer 24 and rheostat 26 are both linear and the Bourdon mechanisms 14 and 16 together with the coupling apparatus 32 and 34 are so selected as to provide transducing of the pressures sensed by the Bourdon mechanisms into linearly proportional resistance portions 47 and 49 respectively. Obviously therefore properly paired non-linear Bourdon mechanisms and a non-linear potentiometer and rheostat can also be used to provide resistances which vary as the variations in the pressures $P_1$ and/or $P_2$.

In operation the pressure ratio indicator 10 may for example be used to measure the ratio of the input and output pressures of a turbine engine installed in a small aircraft.

Thus $P_1$ may be the input pressure and $P_2$ may be the output pressure of the engine air compressor.

The Bourdon mechanisms 14 and 16 are caused to move an amount linearly proportional to the respective absolute pressures $P_2$ and $P_1$ respectively since the enclosure 18 is evacuated. On movement of the Bourdon mechanisms 14 and 16 the wiper arms 46 and 48 of potentiometer 24 and rheostat 26 are caused to move in linear proportion to the movement thereof through the coupling apparatus 32 and 34. Movement of the wiper arms 46 and 48 thus produce a linear variation in the portions 47 and 49 of resistors 42 and 44 which is proportional to the pressures $P_2$ and $P_1$.

The current flowing through the resistance portion 49 will therefore be substantially equal or proportional to the pressure ratio $P_2/P_1$. The ammeter 30 may therefore be calibrated in terms of the pressure ratio $P_2/P_1$.

Figure 2:
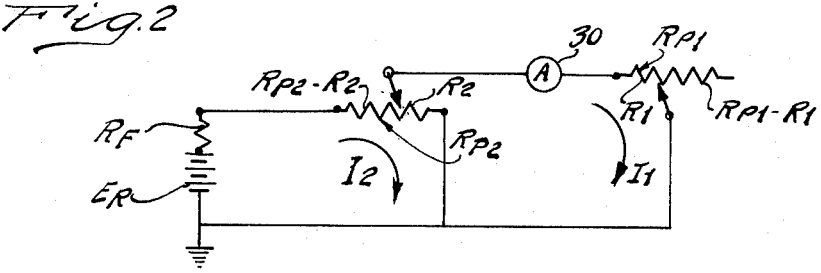
FIGURE 2 is a schematic diagram of an electrical circuit equivalent to the electrical circuit of the pressure ratio indicator shown in FIGURE 1.

In considering in more detail why the indication on the ammeter 30 may be calibrated in terms of the pressure ratio $P_2/P_1$ reference is made to the electrical schematic diagram of FIGURE 2. In the analysis of the electrical diagram of FIGURE 2 the following definitions will be used for convenience in mathematically expressing the operation of the pressure ratio indicator:

$E_R$ is the voltage of the regulated direct current source 22.
$P_1$ is the smaller of two pressures to be compared.
$P_2$ is the larger of two pressures to be compared.
$R_1$ is the portion 49 of the resistor 44 of rheostat 26.
$R_2$ is the portion 47 of the resistance 42 of the potentiometer 24.
$E_2$ is the voltage at the junction of resistor $R_2$ and ammeter 30.
$R_{P1}$ is the total resistance of resistor 44.
$R_{P2}$ is the total resistance of resistor 42.
$R_f$ is the total resistance of resistor 28.
$K_1$ is a physical proportionality constant by which the Bourdon mechanism 16 linearly transduces the pressure $P_1$ into resistance $R_1$ so that $R_1$ is equal to $K_1P_1$.
$K_2$ is a physical proportionality constant by which the Bourdon mechanism 14 linearly transduces the pressure $P_2$ into resistance $R_2$ so that $R_2 = K_2P_2$.
$I_1$ is the current flow through resistance $R_1$.
$I_2$ is the current flow through resistance $R_2$.

Considering the above definitions and the equivalent electrical diagram illustrated in FIGURE 2 it can be seen that by Ohm's law $E_2$ may be expressed as in Equation 1

$$E_2 = E_R - \frac{(R_F + R_{P2} - R_2)E_R}{R_F + R_{P2} - R_2 + \frac{R_1 R_2}{R_1 + R_2}} \quad (1)$$

Equation 1 may further be rewritten as Equation 2:

$$E_2 = E_R \frac{R_2}{R_1}\left(\frac{R_1}{R_F + R_{P2} + \frac{R_2}{R_1}(R_F + R_{P2} - R_2)}\right) \quad (2)$$

Further considering that $I_1$ is equal to $E_2/R_1$ Equation 3 results:

$$I_1 = \frac{E_2}{R_1} = E_R \frac{R_2}{R_1}\left(\frac{1}{R_F + R_{P2} + \frac{R_2}{R_1}(R_F + R_{P2} - R_2)}\right) \quad (3)$$

Equation 3 may be rewritten as Equation 4:

$$I_1 = \frac{E_R}{R_F + R_{P2}} \cdot \frac{R_2}{R_1}\left(\frac{1}{1 + \frac{R_2}{R_1}\left(1 - \frac{R_2}{R_F + R_{P2}}\right)}\right) \quad (4)$$

Substituting $K_1 P_1$ for $R_1$ and $K_2 P_2$ for $R_2$ Equation 4 may be rewritten as Equation 5:

$$I_1 = \frac{E_R K_2}{(R_F + R_{P2})K_1} \frac{P_2}{P_1}\left(\frac{1}{1 + \frac{R_2}{R_1}\left(1 - \frac{R_2}{R_F + R_{P2}}\right)}\right) \quad (5)$$

Further if $R_1$ is much greater than $R_2$ as it is chosen to be and if $R_f + R_{P2}$ is greater than $R_2$ which it will be since $R_{P2}$ contains $R_2$ Equation 5 may then be rewritten as Equation 6 within acceptable accuracy of the pressure ratio indicator 10:

$$I_1 \simeq \frac{E_R K_2}{(R_F + R_{P2})K_1}\left(\frac{P_2}{P_1}\right) \quad (6)$$

Further since $E_R K_2/(R_f + R_{P2})K_1$ is a third constant, K, Equation 7 will result:

$$I_1 \simeq K\frac{P_2}{P_1} \quad (7)$$

Thus it will be seen that with the structure of the invention the current $I_1$ passing through the portion 49 of resistor 44 of rheostat 26 and therefore through ammeter 30 will be representative of the pressure ratio $P_2/P_1$ within limits determined by the magnitude of error introduced by the choosing of $R_1$ much larger than $R_2$ and recognizing that $R_F + R_{P2}$ is larger than $R_2$. The ammeter 30 may therefore be calibrated to read the pressure ratio $P_2/P_1$ directly.

The percentage error introduced into the pressure ratio indication on meter 30 by disregarding the last term of Equation 5 can be expressed by Equation 8:

Percent Error =

$$100\% \left[\frac{\frac{KP_2}{P_1}\left(\frac{1}{1 + \frac{R_2}{R_1}\left(1 - \frac{R_2}{R_F + R_{P2}}\right)} - K\frac{P_2}{P_1}\right)}{\frac{KP_2}{P_1}\left(\frac{1}{1 + \frac{R_2}{R_1}\left(1 - \frac{R_2}{R_F + R_{P2}}\right)}\right)}\right] \quad (8)$$

Equation 8 may be rewritten as Equation 9:

$$\text{Percent Error} = 100\%\frac{R_2}{R_1}\left(\frac{R_2}{R_F + R_{P2}} - 1\right) \quad (9)$$

Therefore, it can be seen that the maximum percent error introduced by the above approximation exists when $P_2$ is a minimum with $P_2/P_1$ a maximum.

For example assume $E_R$ is equal to 28 volts direct current, $30 \leq P_1 \leq$ one pound per square inch, $150 \leq P_2 \leq$ one pound per square inch, $5 \leq P_2/P_1 \leq 1$, $R_{P2} = 150$ ohms, $R_f = 130$ ohms, $K_2 = 1$ ohm per pound per square inch, $K_1 = 1000$ ohms per pound per square inch and $$R_{P1} = 30,000$$

ohms.

Then at $P_2 = 5$ pounds per square inch and with $P_2/P_1$ maximum which is 5 the maximum current according to Equation 6 will be .5 milliampere. Also, the maximum error in accordance with Equation 9 will be .49%. Further when $P_2/P_1$ is a minimum or in the present example 1 the minimum current will be .1 milliampere.

Therefore in the example the current flowing through the meter 30 will be proportional to the ratio of the pressures $P_2/P_1$ and will be between .5 and .1 milliampere. The maximum percent error will be less than half a percent. This current drain and accuracy is acceptable in most installations.

It will therefore be seen that in accordance with the invention there has been provided an extremely simple, economical and reliable pressure ratio indicator. Further, while one embodiment of the present invention has been disclosed in detail it will be understood that other embodiments and modifications of the invention are contemplated. Therefore it is the intention to include all such embodiments and modifications as are defined by the appended claims within the scope of the invention.

What I claim as my invention is:

1. A pressure ratio indicator comprising separate pressure responsive means for sensing separate pressures and moving substantially in response thereto, an electrical circuit operable on being coupled to the separate pressure responsive means to provide an indication of the ratio of the sensed pressures including a source of electrical energy, a pair of variable resistors, one of which is much larger than the other, the smaller of which is connected in series with the source of electrical energy and the larger of which is connected in parallel with a portion of the smaller resistor, apparatus directly coupling the pressure responsive means to the electric circuit for individually varying the portion of the smaller resistance in parallel with the larger resistance and for varying the magnitude of the larger resistance in accordance with the sensed separate pressures and electric current responsive means connected in series with the larger resistor for indicating the ratio of the pressures.

2. Structure as set forth in claim 1 wherein another resistance is provided in series between the source of electrical energy and the resistances in parallel which is much smaller than the other of said resistors.

3. Structure as set forth in claim 1 wherein the pressure responsive means are Bourdon mechanisms and further including an evacuated enclosure for supporting the Bourdon mechanisms.

4. A pressure ratio indicator comprising an evacuated enclosure, a pair of Bourdon mechanisms supported within the evacuated enclosure for sensing the absolute value of two different pressures, an electrical circuit including a source of direct current electrical energy, a trimming resistor and a potentiometer having a wiper arm and a resistance which resistance is in series with the trimming resistor, the trimming resistor and potentiometer resistance being in parallel with the source of electrical energy, a rheostat including a resistance much larger than the potentiometer resistance connected to the wiper arm of the potentiometer and a wiper arm connected to ground, and an ammeter connected between the wiper arm of the potentiometer and the resistance of the rheostat, and separate apparatus for coupling the separate Bourdon mechanisms to the wiper arms of the potentiometer and rheostat to produce rotation of the wiper arms in linear proportion to the pressures sensed by the Bourdon mechanisms each separate apparatus including a pivotally monuted rack operably connected to a Bourdon mechanism, a pinion in mesh with the rack for rotation on movement of the rack by the Bourdon mechanism to which it is connected and a mechanical linkage between the pinion and the wiper arm of the associated potentiometer and rheostat.

5. A pressure ratio indicator comprising separate mechanical means for sensing separate pressures and moving substantially in response thereto, and electrical circuit operable on being directly coupled to the separate mechanical pressure sensing means to provide an indication of the ratio of the sensed pressures including a source of direct current electrical energy, a potentiometer including a wiper arm and a resistance connected in parallel with the source of electrical energy, a rheostat having a grounded wiper arm and a resistance much larger than the resistance of the potentiometer connected to the wiper arm of the potentiometer and an ammeter connected between the wiper arm of the first potentiometer and the resistance of the rheostat, and coupling apparatus for directly coupling the mechanical pressure sensing means to the electrical circuit to vary the position of the wiper arms on the resistances directly in accordance with the movement of the mechanical means.

6. A pressure ratio indicator comprising separate mechanical means for sensing separate pressures, and electrical circuit operable on being directly coupled to the separate mechanical pressure sensing means to provide an indication of the ratio of the sensed pressures including a source of direct current electrical energy, a potentiometer including a wiper arm and a resistance connected in parallel with the source of electrical energy, a rheostat having a grounded wiper arm and a resistance much larger than the potentiometer resistance connected to the wiper arm of the potentiometer and an ammeter connected between the wiper arm of the potentiometer and the resistance of the rheostat, and rack and pinion coupling apparatus actuated by the mechanical pressure sensing means and means for coupling the wiper arms of the potentiometer and rheostat to the rack and pinion means to produce movement of the wiper arms in linear proportion to the pressures sensed by the pressure sensing means.

References Cited by the Examiner

UNITED STATES PATENTS

| 2,985,019 | 5/1961 | Colvin | 73—407 |
| 3,013,234 | 12/1961 | Bourns | 73—412 |

FOREIGN PATENTS 3,023  3/1886  Great Britain.

OTHER REFERENCES

Analog Methods in Computation and Simulation, by Soroka, McGraw-Hill Book Company, Inc., 1954, New York, pages 50 and 51.

LOUIS R. PRINCE, *Primary Examiner.*

ROBERT EVANS, RICHARD C. QUEISSER,
*Examiners*